United States Patent [19]

Okuno et al.

[11] Patent Number: 4,701,426

[45] Date of Patent: Oct. 20, 1987

[54] SILICON CARBIDE-GRAPHITE COMPOSITE MATERIAL

[75] Inventors: Akiyasu Okuno; Masakazu Watanabe, both of Aichi, Japan

[73] Assignee: NGK Spark Plug Co., Ltd., Nagoya, Japan

[21] Appl. No.: 701,837

[22] Filed: Feb. 14, 1985

Related U.S. Application Data

[63] Continuation-in-part of Ser. No. 558,725, Dec. 6, 1983.

[30] Foreign Application Priority Data

Dec. 6, 1982 [JP] Japan ..................................... 212793

[51] Int. Cl.$^4$ ............................................. C04B 35/56
[52] U.S. Cl. ..................................... 501/90; 423/345
[58] Field of Search ................... 501/88, 90; 423/345; 264/65

[56] References Cited

U.S. PATENT DOCUMENTS

| | | | |
|---|---|---|---|
| 3,836,673 | 9/1974 | Weaver et al. | 423/345 |
| 3,966,855 | 6/1976 | Hollenberg et al. | 501/88 |
| 4,004,934 | 1/1977 | Prochazka | 501/90 |
| 4,041,117 | 8/1977 | Prochazka | 501/90 |
| 4,230,497 | 10/1980 | Schwetz et al. | 501/90 |
| 4,295,890 | 10/1981 | Stroke | 264/65 |
| 4,336,266 | 6/1982 | Watanabe et al. | 501/90 |

*Primary Examiner*—William R. Dixon, Jr,
*Assistant Examiner*—Steven Capella
*Attorney, Agent, or Firm*—Sughrue, Mion, Zinn, Macpeak and Seas

[57] ABSTRACT

A silicon carbide-graphite composite material is disclosed. The composite material includes graphite as a secondary phase which is segregated along the grain boundaries of all the silicon carbide grains. The graphite has an average grain size of not more than 3 $\mu$m and is present in a proportion of 1 to 20 vol % based on the volume of the silicon carbide. The composite material has a density greater than 90% of the theoretical density. The composite material is a high density and high strength material.

17 Claims, 5 Drawing Figures

CALCINED (SINTERED)

SILICON CARBIDE-GRAPHITE COMPOSITE MATERIAL

CROSS REFERENCE TO RELATED APPLICATION

This is continuation-in-part application of Ser. No. 558,725 filed Dec. 6, 1983 abandoned.

FIELD OF THE INVENTION

The present invention relates to a high density and high strength silicon carbide-graphite composite material.

BACKGROUND OF THE INVENTION

Because of its excellent chemical and physical properties, silicon carbide has potential applications as structural materials for use in high temperature environments, sliding materials or corrosion-resistant materials, which include mechanical seal rings, plungers, bearings, sand blast nozzles, tappets and microwave absorbers.

Silicon carbide sintered product is conventionally produced by reaction sintering, hot pressing or pressureless sintering. Of these methods, the pressureless sintering is most commonly used. In order to improve the sinterability of silicon carbide, various sintering aids have recently been developed.

Two typical methods which have been developed for the sintering of silicon carbide are hereunder described according to crystal form.

First, Japanese Patent Application (OPI) No. 148712/76 corresponding to U.S. Pat. No. 4,124,667 (the term "OPI" as used herein refers to a "published unexamined Japanese patent application") describes a method wherein $\alpha$-silicon carbide is mixed with 0.15 to 3.0 wt% of boron, 0.5 to 5.0 wt% of a carbonized organic material and up to 1.0 wt% of an additional carbon. The mixture is molded into a suitable shape and then the molded product is sintered so as to provide a density of at least 2.4 g/cm$^3$ which is greater than 75% of theoretical density.

Second, Japanese Patent Application (OPI) No. 78609/75 corresponding to U.S. Pat. No. 4,004,934 describes a process for producing sintered silicon carbide with a density not smaller than 85% of theoretical density by sintering a molded mixture of $\beta$-silicon carbide with a boron compound corresponding to 0.3 to 3.0 wt% of boron and a carbonaceous additive corresponding to 0.1 to 1.0 wt% of carbon. According to the specification, the function of carbonaceous additive is to reduce silica which always is present in silicon carbide powder in small amounts or which forms on heating from oxygen absorbed on the powder surfaces. The other function of the carbonaceous additive is that it acts as a getter for free silicon. If this additive is incorporated in an amount of more than 1.0 wt%, the unreacted excess carbon tends to form voluminous grains in the sintered silicon carbide that act much like permanent pores and such excess thereby limits the ultimate achievable density and strength.

However, whether the silicon carbide is in the $\alpha$- or $\beta$-form, if sintering is effected at temperatures higher than 2,000° C. in an attempt to obtain a dense product, $\beta$-silicon carbide experiences grain growth as it is transformed to $\alpha$-silicon carbide. Further, $\alpha$-silicon carbide also undergoes grain growth although no phase transformation occurs. In any event, it has been impossible to obtain a dense and microfine sintered product by any of the two prior art techniques.

SUMMARY OF THE INVENTION

The present inventors have determined that carbon is effective in inhibiting the grain growth of silicon carbide during the sintering and have found that 1 to 20 vol% of carbon black based on the volume of silicon carbide incorporated in addition to the sintering aids will inhibit the grain growth of silicon carbide during sintering whereas the same carbon black is converted into graphite so as to produce a composite material wherein the resulting microfine graphite as a secondary phase of the composite material is segregated along the grain boundaries of all the silicon carbide grains in the composite material.

This composite material has a dense and microfine structure which exhibits high mechanical strength and great thermal shock resistance.

BRIEF DESCRIPTION OF THE DRAWINGS

FIG. 2A shows the sample prepared from a powder mixture containing neither carbon black nor graphite; FIG. 2B shows the sample prepared from a powder mixture containing graphite; and FIG. 2C shows the sample prepared from a powder mixture containing carbon black.

DETAILED DESCRIPTION OF THE INVENTION

Figure 1A:
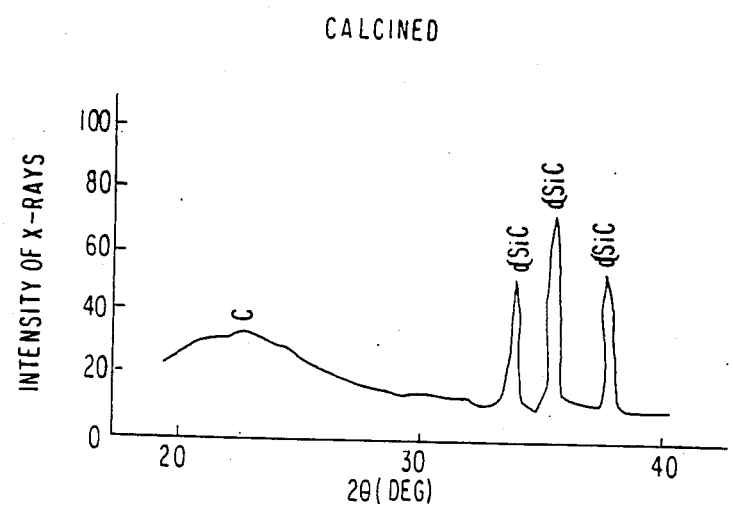
FIGS. 1(a) and 1(b) are graphs showing the X-ray diffractometry of a calcined (unsintered) sample and a sintered silicon carbide composite sample.

Preferred embodiments of the present invention are:

(1) a silicon carbide-graphite composite material which is produced by a process comprising the steps of:

adding a sintering aid to silicon carbide of an average grain size less than 1 μm, said sintering aid comprising not less than 0.1 wt% and less than 1.0 wt% of a compound selected from the group consisting of boron, a boron compound which includes a corresponding amount of boron, aluminum and an aluminum compound which includes a corresponding amount of aluminum; and 0.1 to 6.0 wt% of a compound selected from the group consisting of carbonaceous compounds which include a corresponding amount of carbon each based on the weight of silicon carbide;

further adding carbon black to silicon carbide in an amount of 1 to 20 vol% based on the volume of the silicon carbide;

blending the compositions into an intimate mixture;

molding the intimate mixture to obtain a molded body; and sintering the molded body at about atmospheric pressure.

(2) A silicon carbide-graphite composite material, comprising:

a silicon carbide comprising less than 1.0 wt% of a compound selected from the group consisting of boron, a boron compound which includes a corresponding amount of boron, aluminum and an aluminum compound which includes a corresponding amount of aluminum as a primary phase; and graphite as a secondary phase having an average grain size of not more than 3 μm segregated along the grain boundaries of all the silicon carbide grains in the composite material in a proportion of 1 to 20 vol% based on the volume of silicon carbide, said composite material having a density greater than 90% of the theoretical density.

Specifically, the composite material of the present invention has a bending strength at least 20% greater than that of the conventionally sintered product and has thermal shock resistance 90° to 200° C. higher than that of the conventional product. As a further advantage, the carbon black added is converted into graphite during the sintering and becomes segregated along the grain boundaries of all the silicon carbide grains in the composite material. Accordingly, the coefficient of kinetic friction of the composite material is reduced by at least 20% compared with the conventional sintered silicon carbide. The graphite forming the secondary phase of the composite material has such a high resistance to corrosion that it will not impair the chemical stability of silicon carbide. The present inventors have found that the average grain size of the graphite forming the secondary phase of the composite material is not more than 3 μm.

The carbon source used in the present invention in addition to the sintering aids must be carbon black for the following reasons. If the carbon source added is a carbonaceous organic compound such as a phenolic resin, a uniform dispersion may be obtained. However, because of the inherent activity of the phenolic resin as a binder, the molding and subsequent processing of the green body becomes difficult if the phenolic resin is added in an amount greater than 10 wt% based on the weight of the silicon carbide. Furthermore, because almost half of the phenolic resin added evaporates at low temperatures and causes a significant decrease in the green density of the calcined product, the formation of dense product is prevented. If graphite powder, rather than carbon black, is directly added as the carbon source, the effect of inhibiting the grain growth of silicon carbide during sintering is smaller than that of the carbon black. In addition, there is no increase in the bending strength of the final composite material. If less than 1.0 vol% of carbon black based on the volume of silicon carbide is added, various desired effects are not obtained. If, on the other hand, more than 20 vol% of carbon black based on the volume of silicon carbide is used, the sinterability of silicon carbide is impaired and its other desired properties are not maintained.

For the purpose of obtaining a dense composite material, it is most effective to use silicon carbide of a grain size not greater than 1 μm. By adding 1 to 20 vol%, preferably 1 to 10 vol%, of carbon black based on the volume of silicon carbide, the grain growth of silicon carbide can be inhibited and effective sintering can be achieved. If the amount of carbon black added is less than 1 vol%, the possibility of phase transformation or/and grain growth is increased. Using more than 20 vol% of carbon black causes a reduction in the sintering efficiency, which eventually leads to a product of low quality.

The suitable amounts of the sintering aids used in the present invention have been determined for the following reasons. If the boron and/or aluminum compounds selected from boron, a boron compound, aluminum or an aluminum compound corresponding to boron and/or aluminum are used in an amount of less than 0.1 wt%, the sinterability of the silicon carbide is impaired. If, on the other hand, the boron and/or aluminum compound corresponding to boron and/or aluminum are used in an amount of not less than 1.0 wt%, the thermal shock resistance of the composite material is decreased. The boron and/or aluminum compounds are partially dispersed from the sintering body during sintering, but the majority thereof remains as a solid solution with silicon carbide in the composite material. Further, if the carbonaceous compounds selected from carbonaceous compounds corresponding to carbon are used in an amount of either less than 0.1 wt% or more than 6.0 wt%, the sinterability of the silicon carbide is impaired. The function of the carbonaceous compounds is mainly to reduce silica which is always present or formed upon heating, as described above. The carbonaceous compounds react with silica during sintering according to the following equation and they do not remain in the composite material at all.

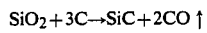

$$SiO_2 + 3C \rightarrow SiC + 2CO \uparrow$$

The present invention is hereunder described in greater detail by working examples which are given here for illustrative purposes only and are by no means intended to limit the scope of the invention.

EXAMPLE 1

A wet-mixture of α-silicon carbide powder (average particle size: 0.8 μm), 0.5 wt% boron carbide, 8.0 wt% phenolic resin based on the weight of silicon carbide and 5 vol% carbon black based on the volume of silicon carbide was prepared while adding water. The mixture was dried, sieved and molded into 30 mm×10 mm×5 mm in this order. The molded body were calcined in nitrogen gas at 800° C. for 60 minutes and subsequently sintered in argon gas atmosphere at 2,100° C. under atmospheric pressure for 60 minutes.

Figure 1B:
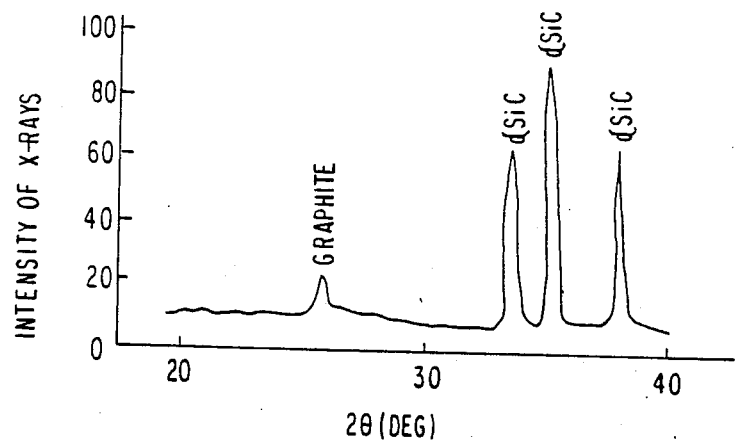

The calcined (unsintered) samples and those of the sintered composite materials were ground into fine particles in an agate mortar. The ground samples were analyzed by an X-ray diffract meter and the results are shown in FIGS. 1(a) and 1(b), from which one can see that all the carbon black that was initially added was converted into graphite which was segregated in the composite material.

EXAMPLE 2

Composite samples were prepared in the same manner as in Example 1 and subjected to grinding. They were then wet-polished with a diamond paste (9 μm) and observed under optical microscope to check for the dispersion of graphite. The polished surface was then etched with Murakami reagent having the following composition and observed for the sizes of silicon carbide grains and graphite grains segregated along the grain boundaries of all the silicon carbide grains.

| The Composition of Murakami Reagent | |
|---|---|
| Sodium Hydroxide | 7 g |
| Potassium Ferricyanide | 10 g |
| Water | 100 g |

Figure 2A:
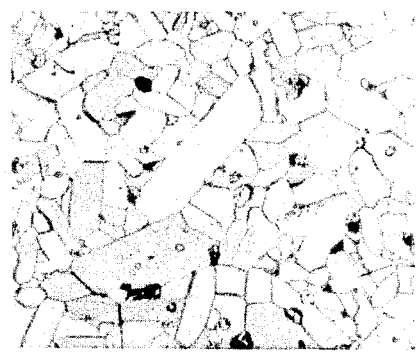
FIGS. 2A, 2B and 2C show the micrographs of three types of sintered silicon carbide.
Figure 2B:
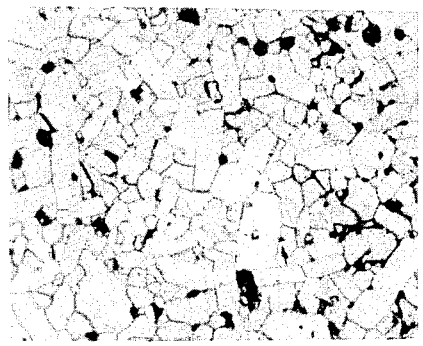
Figure 2C:
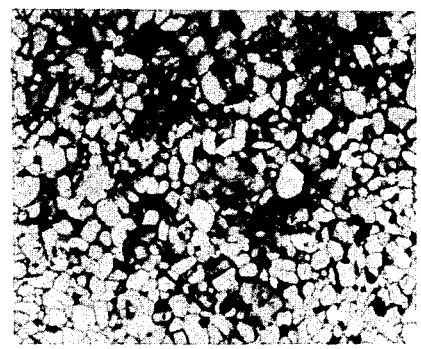

The comparative experiment was conducted among composite samples prepared in the same manner as in Example 1, sintered samples prepared in the same manner as in Example 1 except that carbon black was not contained and composite samples prepared in the same manner as in Example 1 except that graphite was contained instead of carbon black. The results are shown in FIG. 2 by micrographs A (the sample prepared from a powder mixture containing neither carbon black nor graphite), B (the sample prepared from a mixture containing graphite), and C (the sample prepared from a mixture containing carbon black). In the absence of graphite and carbon black, excessive grain growth of silicon carbide occurred. This could be partly inhibited by the addition of graphite, but a composite material having a finer and denser structure could be obtained by addition of carbon black.

EXAMPLE 3

Composite samples were prepared in the same manner as in Example 1 except that the amount of carbon black was varied as shown in Table 1. The bulk densities of the so prepared samples were measured. The samples were then ground into 4 mm×8 mm×25 mm and subjected to a three-point bending test. The results are also shown in Table 1, from which one can see that the samples prepared from powder mixture containing at least 1 vol% of carbon black had a bending strength at least 20% greater than that of the sample containing no carbon black. When the content of carbon black exceeded 20 vol%, samples having a density greater than 90% of theoretical density could not be obtained. Furthermore, a significant decrease in the bending strength was observed. When graphite rather than carbon black was added, there was no increase in the bending strength no matter how much graphite was added.

TABLE 1

| Sample No. | Additive | Amount (vol %) | Relative Density (%) | Bending Strength (kg/mm²) |
| --- | --- | --- | --- | --- |
| 1 | Carbon Black | 0 | 98.5 | 45 |
| 2 | " | 1 | 98.5 | 55 |
| 3 | " | 3 | 98.5 | 55 |
| 4 | " | 5 | 98.0 | 60 |
| 5 | " | 10 | 97.0 | 50 |
| 6 | " | 20 | 90.0 | 40 |
| 7 | " | 30 | 77.0 | 15 |
| 8 | Graphite | 1 | 98.5 | 45 |
| 9 | " | 3 | 98.5 | 43 |
| 10 | " | 5 | 97.5 | 43 |
| 11 | " | 10 | 96.5 | 40 |
| 12 | " | 20 | 88.0 | 35 |
| 13 | " | 30 | 75.0 | 10 |

EXAMPLE 4

Composite samples were prepared in the same manner as in Example 3 and ground into 4 mm×8 mm×25 mm. The thermal sock resistance (ΔT) of each sample was measured by the water-quenching method, wherein a sample that had been held at a predetermined temperature (T°C.) for 15 minutes was thrown into water (To°C.) to determine the critical temperature (ΔT=T−To) that caused no decrease in the bending strength of the sample. The results of this test are shown in Table 2, from which one can see that the thermal shock resistance (ΔT) increased as an increase of the content of carbon black. The thermal shock resistance of the sample containing 20 vol% of carbon black was as much as 200° C. higher than the corresponding value of the sample containing no carbon black.

TABLE 2

| Sample No. | Additive | Amount (vol %) | Relative Density (%) | Thermal Shock Resistance ΔT (°C.) |
| --- | --- | --- | --- | --- |
| 14 | Carbon Black | 0 | 98.5 | 280 |
| 15 | " | 1 | 98.5 | 370 |
| 16 | " | 3 | 98.5 | 370 |
| 17 | " | 5 | 98.0 | 370 |
| 18 | " | 10 | 97.0 | 400 |
| 19 | " | 20 | 90.0 | 480 |
| 20 | " | 30 | 77.0 | 480 |

EXAMPLE 5

Composite samples were prepared in the same manner as in Example 1 except that the amount of boron carbide was varied from 0 to 3.0 wt%, as shown in Table 3. The thermal shock resistance (ΔT) of each sample was measured in the same manner as in Example 4. The results of this test are shown in Table 3, from which one can see that the thermal shock resistance gradually decreased as the content of boron carbide was increased when the content thereof was not less than 1.0 wt%, and the sinterability of the silicon carbide was insufficient when the content was less than 0.1 wt%.

TABLE 3

| Sample No. | Additive | Amount (wt %) | Relative Density (%) | Thermal Shock Resistance ΔT (°C.) |
| --- | --- | --- | --- | --- |
| 21 | B₄C | 0 | 65.0 | — |
| 22 | " | 0.1 | 93.0 | 370 |
| 23 | " | 0.5 | 98.5 | 370 |
| 24 | " | 1.0 | 98.5 | 330 |
| 25 | " | 3.0 | 97.0 | 300 |

EXAMPLE 6

Composite sintered rings (outside diameter: 30 mm, inside diameter: 20 mm, thickness: 5 mm) were prepared in the same manner as in Example 3. After grinding their sliding faces, the sliding faces were wet-polishing with a diamond paste (9 μm) and subjected to a wet-sliding test under the following conditions:

Tester: Mechanical seal type (ring-on-ring system)
Lubricant: Water
Sliding Velocity: 100 m/min.
Surface Pressure; 7 kg/cm²
Test Period: 100 hr.

The results of the wet-sliding test are shown in Table 4, from which one can see that the samples prepared from powder mixtures containing at least 1 vol% of carbon black had coefficients of kinetic friction at least 20% smaller than the sample containing no carbon black. This reduction in the friction coefficient was accompanied by a 50% reduction in the resulting wear. However, it has been found that addition of 30 vol% or higher of carbon black makes it impossible to sinter up to 80% or higher of theoretical density, and causes increases in the coefficient of kinetic friction and the wear.

TABLE 4

| Sample No. | Additive | Amount (vol %) | Relative Density (%) | Kinetic Coefficient of Friction | Wear ($\times 10^{-9}$ mm$^3$/mmKg) |
| --- | --- | --- | --- | --- | --- |
| 26 | Carbon Black | 0 | 98.5 | 0.0050 | 6 |
| 27 | Carbon Black | 1 | 98.5 | 0.0040 | 3 |
| 28 | Carbon Black | 3 | 98.5 | 0.0035 | 3 |
| 29 | Carbon Black | 5 | 98.0 | 0.0030 | 3 |
| 30 | Carbon Black | 10 | 97.0 | 0.0030 | 3 |
| 31 | Carbon Black | 20 | 90.0 | 0.0040 | 4 |
| 32 | Carbon Black | 30 | 77.0 | 0.0200 | 11 |

EXAMPLE 7

A wet-mixture of β-silicon carbide powder (average particle size: 0.3 μm), 0.5 wt% boron carbide, 6.0 wt% phenolic resin based on the weight of silicon carbide and carbon black in the various amounts based on the volume of silicon carbide as shown in Table 5 was prepared while adding water. The mixture was dried, sieved and molded into 30 mm×10 mm×5 mm in this order. The molded body were calcined in nitrogen gas at 800° C. for 60 minutes and subsequently sintered in argon gas atmosphere at 2,050° C. under atmospheric pressure for 60 minutes. The bulk densities of the so prepared samples were measured. The samples were then ground into 4 mm×8 mm×25 mm and subjected to a three-point bending test. The results are also shown in Table 5, from which one can see that in the case of using β-silicon carbide the samples prepared from powder mixtures containing at least 1 vol% of carbon black had a bending strength at least 20% greater than that of the sample containing no carbon black. When the content of carbon black exceeded 20 vol%, samples having a density greater than 90% of theoretical density could not be obtained. Furthermore, a significant decrease in the bending strength was observed. When graphite rather than carbon black was added, there was no increase in the bending strength no matter how much graphite was added.

TABLE 5

| Sample No. | Additive | Amount (vol %) | Relative Density (%) | Bending Strength (kg/mm$^2$) |
| --- | --- | --- | --- | --- |
| 33 | Carbon Black | 0 | 98.8 | 55 |
| 34 | " | 1 | 98.8 | 66 |
| 35 | " | 3 | 98.7 | 68 |
| 36 | " | 5 | 98.3 | 75 |
| 37 | " | 10 | 97.5 | 60 |
| 38 | " | 20 | 91.0 | 52 |
| 39 | " | 30 | 77.5 | 20 |
| 40 | Graphite | 1 | 98.8 | 54 |
| 41 | " | 3 | 98.8 | 50 |
| 42 | " | 5 | 97.7 | 50 |
| 43 | " | 10 | 96.5 | 38 |
| 44 | " | 20 | 89.0 | 33 |
| 45 | " | 30 | 76.0 | 12 |

The foregoing data show that the present invention provides a silicon carbind-graphite composite material having improved friction coefficient, bending strength and thermal shock resistance.

While the invention has been described in detail and with reference to specific embodiments thereof, it will be apparent to one skilled in the art that various changes and modifications can be made therein without departing from the spirit and the scope thereof.

What is claimed is:

1. A silicon carbide-graphite composite material in the as sintered state which is produced by a process comprising the steps of:
adding a sintering aid to α-silicon carbide of an average grain size less than 1 μm, said sintering aid comprising not less than 0.1 wt% and less than 1.0 wt% of a compound selected from the group consisting of boron and a boron compound which includes a corresponding amount of boron; and 0.1 to 6.0 wt% of a compound selected from the group consisting of organic carbonaceous compounds which includes a corresponding amount of carbon each based on the weight of silicon carbide;
further adding carbon black to α-silicon carbide in an amount of 1 to 20 vol% based on the volume of the silicon carbide as a silicon carbide grain growth inhibitor;
blending the compositions into an intimate mixture;
molding the intimate mixture to obtain a molded body; and
sintering the molded body at about atmospheric pressure.

2. A silicon carbide-graphite composite material in the as sintered state, comprising:
a silicon carbide comprising less than 1.0 wt% of a compound selected from the group consisting of boron and a boron compound which includes a corresponding amount of boron as a primary phase; and
graphite as a secondary phate having an average grain size of not more than 3 μm segregated along the grain boundaries of all the silicon carbide grains in the composite material in a proportion of 1 to 20 vol% based on the volume of silicon carbide, said composite material having a density greater than 90% of theoretical density;
which is produced by a process comprising the steps of:
adding a sintering aid to α-silicon carbide of an average grain size less than 1 μm, said sintering aid comprising not less than 0.1 wt% and less than 1.0 wt% of a compound selected from the group consisting of boron and a boron compound which includes a corresponding amount of boron; and 0.1 to 6.0 wt% of a compound selected from the group consisting of organic carbonaceous compounds which includes a corresponding amount of carbon each based on the weight of silicon carbide;
further adding carbon black as a silicon carbide grain growth inhibitor to α-silicon carbide in an amount of 1 to 20 vol% based on the volume of the silicon carbide;
blending the compositions into an intimate mixture;
molding the mixture to obtain a molded body; and
sintering the molded body at about atmospheric pressure.

3. A silicon carbide-graphite material as in claim 2, wherein the graphite has been derived from the carbon black upon production of the composite material.

4. A silicon carbide-graphite material as in claim 1, said composite material having improved shock resistance and bending strength and a reduced coefficient of kinetic friction.

5. A silicon carbide-graphite material as in claim 3, said composite material having improved shock resistance and bending strength and a reduced coefficient of kinetic friction.

6. A silicon carbide graphite composite material as claimed in claim 4, said graphite which comprises the secondary phase of the composite material having a high heat resistance and not impairing the chemical stability of the silicon carbide.

7. A silicon carbide graphite composite material as claimed in claim 3, said graphite which comprises the secondary phase of the composite material having a high heat resistance and not impairing the chemical stability of the silicon carbide.

8. A silicon carbide graphite composite material as claimed in claim 1, wherein said carbonaceous compound reacts with silica during sintering and does not remain in the composite material after sintering.

9. A silicon carbide graphite composite material as claimed in claim 3, wherein said carbonaceous compound reacts with silica during sintering and does not remain in the composite material after sintering.

10. A silicon carbide graphite composite material as claimed in claim 1, wherein said carbonaceous compound comprises a phenolic resin.

11. A silicon carbide graphite composite material as claimed in claim 2, wherein said organic carbonaceous compound comprises a phenolic resin.

12. A silicon carbide graphite composite material as claimed in claim 5, wherein said organic carbonaceous compound comprises a phenolic resin.

13. A silicon carbide graphite composite material as claimed in claim 1, wherein said organic carbonaceous compound is one which can supply carbon obtained by decomposition of an organic compound for use as a carbon component of the sintering aid.

14. A silicon carbide graphite composite material as claimed in claim 2, wherein said organic carbonaceous compound is one which can supply carbon obtained by decomposition of an organic compound for use as a carbon component of the sintering aid.

15. A silicon carbide-graphite composite material as claimed in claim 1, wherein said sintering aid contains the boron.

16. A silicon carbide-graphite composite material as claimed in claim 1, wherein said sintering aid contains the boron compound which includes a corresponding amount of boron.

17. A silicon carbide-graphite composite material as claimed in claim 1, wherein said sintering aid contains the carbonaceous compound which includes a corresponding amount of carbon.

* * * * *